(12) United States Patent
Spradlin et al.

(10) Patent No.: US 11,375,724 B2
(45) Date of Patent: Jul. 5, 2022

(54) SMOKING MATERIALS

(71) Applicants: Sean Spradlin, Chicago, IL (US);
Phillip Spradlin, Royal Oak, MI (US)

(72) Inventors: Sean Spradlin, Chicago, IL (US);
Phillip Spradlin, Royal Oak, MI (US)

( * ) Notice: Subject to any disclaimer, the term of this patent is extended or adjusted under 35 U.S.C. 154(b) by 689 days.

(21) Appl. No.: 15/700,837

(22) Filed: Sep. 11, 2017

(65) Prior Publication Data

US 2019/0075805 A1     Mar. 14, 2019

(51) Int. Cl.
*A23B 4/048*     (2006.01)
*A23L 27/10*     (2016.01)
*A23L 27/27*     (2016.01)

(52) U.S. Cl.
CPC .............. *A23B 4/048* (2013.01); *A23L 27/10* (2016.08); *A23L 27/27* (2016.08); *A23V 2002/00* (2013.01)

(58) Field of Classification Search
CPC ......... A23B 4/048; A23L 27/10; A23L 27/27; A23V 2002/00
See application file for complete search history.

(56) References Cited

U.S. PATENT DOCUMENTS

| 4,725,286 A | 2/1988 | Brame |
| 6,093,224 A | 7/2000 | Jones |

| 2004/0224067 A1 | 11/2004 | Burt |
| 2013/0247455 A1 | 9/2013 | Reddy et al. |
| 2014/0283440 A1 | 9/2014 | Beadles |

FOREIGN PATENT DOCUMENTS

WO     2016/124639 A1     8/2016

OTHER PUBLICATIONS

Leftover Slum gum NPL(https://www.beesource.com/forums/showthread.php?321697-What-to-do-with-the-waste-leftover-from-rendering-wax) , 2015.*
Little eco footprints: How to make natural citrus and beeswax firelighters; Jun. 11, 2015; http://www.littleecofootprints.com/2015/06/how-to-make-natural-firelighters.html.

* cited by examiner

*Primary Examiner* — Erik Kashnikow
*Assistant Examiner* — Assaf Zilbering
(74) *Attorney, Agent, or Firm* — McDonnell Boehnen Hulbert & Berghoff LLP

(57) ABSTRACT

The present disclosure relates to smoke flavoring compositions, to methods for making such compositions, and to methods for imparting a smoke flavoring to food by burning such compositions. For example, in certain embodiments, the disclosure provides a dried smoke flavoring composition that includes one or more slumgum components, beeswax, and optionally, honey.

20 Claims, No Drawings

SMOKING MATERIALS

FIELD OF THE DISCLOSURE

This disclosure relates generally to smoking materials. More particularly, the present disclosure relates to dried smoke flavoring compositions, to methods for making such compositions, and to methods for imparting a smoke flavoring to food by burning such compositions.

TECHNICAL BACKGROUND

Slumgum is a byproduct of honey extraction and beeswax-rendering processes that is conventionally treated as waste and discarded. When comb is rendered to produce wax, a residue comprising animal-derived components such as carcasses, brood cocoons, larvae, propolis, excrement, etc., mixed with some amount of beeswax and, in some cases, honey, is left behind. Such animal-derived components may be derived from honey bees or from any of a number of species that could infest the comb—wax moths, Varroa mites, ants, spiders, etc. Honeycomb, the comb in which honey bees contain their larvae and stores of honey, after honey extraction and rendering, provides little slumgum. Brood comb, the normally dark comb in which a new brood is raised by the honey bee colony, after rendering, provides a significant amount of slumgum. Many beekeepers, in fact, treat off-color comb itself as slumgum, and discard it rather than render any beeswax.

The smoking of foods is an old, well-established practice. In modern times, smoking is performed primarily to flavor foods, rather than to preserve them. Smoke flavor may be imparted to foods through a cold smoking process, a hot smoking process, or a smoke roasting process. In each process, smoke flavor is provided by burning, or merely heating, a smoking material. Conventional smoking materials are lignocellulosic materials including hardwoods such as apple, cherry, mesquite, maple, or hickory wood. Heat can be provided to hot smoking and smoke roasting processes, carried out at temperatures of 52-80° C. and at least 82° C., respectively, by the burning of a smoking material (e.g., wood chips or charcoal briquettes) or by an external heat source (e.g., a gas or electric heat source). Smoking can be performed in a variety of food preparation apparatuses. For example, smoke roasting can be performed in an oven, grill, barbecue pit, etc.; hot smoking can be performed in an offset smoker, vertical smoker, smoke box, vertical water smoker, propane smoker, etc. Conventional smoking processes are often difficult to perform consistently—when smoking materials such as hardwood chips are burned, temperature and airflow must be tightly controlled to maintain consistent, proper conditions. Such smoking materials may be heated rather than burned to improve consistency, but this requires an external, regulated heat source. Smoking materials such as charcoal, on the other hand, burn consistently, but provide relatively little smoke flavor. Moreover, charcoal often comprises low-quality materials and non-natural additives.

Accordingly, there remains a need in the art for a smoking material that comprises natural materials, provides a desirable smoke flavor, and/or burns consistently.

SUMMARY OF THE DISCLOSURE

In one aspect, the present disclosure provides a dried smoke flavoring composition comprising
   one or more slumgum components;
   beeswax; and
   optionally, honey;
  wherein the composition comprises less than about 10 wt. % honey, calculated on a dried basis;
  wherein the slumgum components are present in the composition in an amount of at least about 2 wt. %, calculated on a dried basis; and
  wherein the beeswax, honey, and slumgum components are present in the composition in a combined amount of at least about 80 wt. %, calculated on a dried basis.

In another aspect, the present disclosure provides a method for preparing a smoke flavoring composition, the method comprising
  providing a formable mixture comprising
   one or more slumgum components;
   beeswax; and
   optionally, honey; and
  forming the mixture;
  wherein the composition comprises less than about 10 wt. % honey;
  wherein the slumgum components are present in the composition in an amount of at least about 2 wt. %;
  wherein the beeswax, honey, and slumgum components are present in the composition in a combined amount of at least about 80 wt. %; and
  wherein the composition comprises less than about 10 wt. % water.

In another aspect, the present disclosure provides a method of providing smoke flavor comprising burning a smoke flavoring composition as described herein to provide smoke, and contacting the smoke with food.

DETAILED DESCRIPTION

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The disclosure relates to dried smoke flavoring compositions comprising beeswax, one or more slumgum components, and, optionally, honey. As used herein, the term "smoke flavoring composition" describes a smoking material used to provide a smoke flavor. The person of ordinary skill in the art will appreciate that a smoke flavoring composition may, in some cases, also provide heat. In various aspects and embodiments of the compositions as otherwise described herein, the slumgum components include one or more of carcasses, brood cocoons, larvae, propolis, and excrement of honey bees or a comb-infesting species. The disclosure demonstrates that such compositions are natural and burn consistently, providing a desirable smoke flavor.

One aspect of the disclosure is a dried smoke flavoring composition comprising beeswax, one or more slumgum components, and, optionally, honey. As used herein, the term "slumgum components" describes any animal-derived component derived from honey bees or a comb-infesting species. As used herein, the term "honey bee" describes any bee member of the genus *Apis*, such as, for example, the Western honey bee. As used here, the term "comb-infesting species" describes any animal species present in a honey bee nest, including, for example, wax moths, *Varroa* mites (*Varroa destructor*), ants, and spiders. As used herein, the term "wax moth" describes members of both the greater wax moth (*Galleria mellonella*) and lesser wax moth (*Achroia grisella*) species, and includes both larva (i.e., waxworms) and adult forms of each species. As used herein, the term "animal-derived components" describes any animal-derived material present in the brood comb or honeycomb of a honey bee nest, including, for example, carcasses, brood cocoons, larvae, propolis, and excrement. The person of ordinary skill in the art will appreciate that the term "animal derived," as used herein, describes materials produced or provided by an animal, and the animal, or any portion of the animal, itself. The person of ordinary skill in the art will further appreciate that, for example, the term "honey-bee-derived" similarly describes materials produced or provided by a honey bee, and the honey bee itself (or any portion thereof). For example, honey and beeswax, in addition to slumgum components, are animal-derived materials.

In one aspect of the compositions of the disclosure, the composition is dried. For example, in certain embodiments of the compositions as otherwise described herein, the composition comprises less than about 10 wt. % water, less than about 9 wt. % water, less than about 8 wt. % water, less than about 7 wt. % water, less than about 6 wt. % water, less than about 5 wt. % water, less than about 4 wt. % water, less than about 3 wt. %, water, less than about 2.5 wt. % water, less than about 2 wt. % water, less than about 1.5 wt. % water, or less than about 1 wt. %. In another example, in certain embodiments of the compositions as otherwise described herein, the composition is substantially free of water.

In one aspect of the compositions of the disclosure, honey is present in an amount of less than about 10 wt. %. For example, in certain embodiments of the compositions as otherwise described herein, honey is present in an amount of less than about 9.5 wt. %, or less than about 9 wt. %, or less than about 8.5 wt. %, or less than about 8 wt. %, or less than about 7.5 wt. %, or less than about 7 wt. %, or less than about 6.5 wt. %, or less than about 6 wt. %, or less than about 5.5 wt. %, or less than about 5 wt. %, or less than about 4.5 wt. %, or less than about 4 wt. %, or less than about 3.5 wt. %, or less than about 3 wt. %, or less than about 2.5 wt. %, or less than about 2 wt. %, or less than about 1.5 wt. %, or less than about 1 wt. %, calculated on a dried basis. In another example, in certain embodiments of the compositions as otherwise described herein, the composition is substantially free of honey.

The person or ordinary skill in the art will appreciate that the amounts of material in the dried smoke flavoring composition are to be calculated on an as-dried basis, that is, exclusive of any adsorbed water.

In one aspect of the compositions of the disclosure, slumgum components are present in an amount of at least about 2 wt. %. For example, in certain embodiments of the compositions as otherwise described herein, slumgum components are present in an amount of at least about 2.5 wt. %, or at least about 3 wt. %, or at least about 3.5 wt. %, or at least about 4 wt. %, or at least about 4.5 wt. %, or at least about 5 wt. %, or at least about 6 wt. %, or at least about 7 wt. %, or at least about 8 wt. %, or at least about 9 wt. %, or at least about 10 wt. %, or at least about 11 wt. %, or at least about 12 wt. %, or at least about 13 wt. %, or at least about 14 wt. %, or at least about 15 wt. %, or at least about 17.5 wt. %, or at least about 20 wt. %, calculated on a dried basis.

In certain embodiments of the compositions as otherwise described herein, beeswax is present in an amount within the range of about 1 wt. % to about 98 wt. %. For example, in certain embodiments of the compositions as otherwise described herein, beeswax is present in an amount within the range of about 1 wt. % to about 50 wt. %, or about 5 wt. % to about 55 wt. %, or about 10 wt. % to about 60 wt. %, or about 15 wt. % to about 65 wt. %, or about 20 wt. % to about 70 wt. %, or about 25 wt. % to about 75 wt. %, or about 30 wt. % to about 80 wt. %, or about 35 wt. % to about 85 wt. %, or about 40 wt. % to about 90 wt. %, or about 45 wt. % to about 95 wt. %, or about 50 wt. % to about 98 wt. %, calculated on a dried basis.

In one aspect of the compositions of the disclosure, the beeswax, honey, and slumgum components are present in a combined amount of at least about 80 wt. %. For example, in certain embodiments of the compositions as otherwise described herein, the beeswax, honey, and slumgum components are present in a combined amount of at least about 82.5 wt. %, or at least about 85 wt. %, or at least about 87.5 wt. %, or at least about 90 wt. %, or at least about 92.5 wt. %, or at least about 95 wt. %, or at least about 97.5 wt. %, calculated on a dried basis.

In certain embodiments of the compositions as otherwise described herein, slumgum components are present in an amount within the range of about 2 wt. % to about 25 wt. %, and beeswax is present in an amount within the range of about 70 wt. % to about 98 wt. %. For example, in certain embodiments of the compositions as otherwise described herein, slumgum components are present in an amount within the range of about 2 wt. % to about 22.5 wt. %, or about 2 wt. % to about 20 wt. %, or about 2 wt. % to about 17.5 wt. %, or about 2 wt. % to about 15 wt. %, or about 2 wt. % to about 12.5 wt. %, or about 2 wt. % to about 10 wt. %, or about 2 wt. % to about 7.5 wt. %, or about 2 wt. % to about 5 wt. %, or about 5 wt. % to about 25 wt. %, or about 7.5 wt. % to about 25 wt. %, or about 10 wt. % to about 25 wt. %, or about 12.5 wt. % to about 25 wt. %, or about 15 wt. % to about 25 wt. %, or about 17.5 wt. % to about 25 wt. %, or about 20 wt. % to about 25 wt. %, or about 5 wt. % to about 22.5 wt. %, or about 7.5 wt. % to about 20 wt. %, or about 10 wt. % to about 17.5 wt. %, and beeswax is present in an amount within the range of about 70 wt. % to about 95 wt. %, or about 70 wt. % to about 92.5 wt. %, or about 70 wt. % to about 90 wt. %, or about 70 wt. % to about 87.5 wt. %, or about 70 wt. % to about 85 wt. %, or about 70 wt. % to about 82.5 wt. %, or about 70 wt. % to about 80 wt. %, or about 70 wt. % to about 77.5 wt. %, or about 70 wt. % to about 75 wt. %, or about 72.5 wt. % to about 98 wt. %, or about 75 wt. % to about 98 wt. %, or about 77.5 wt. % to about 98 wt. %, or about 80 wt. % to about 98 wt. %, or about 82.5 wt. % to about 98 wt. %, or about 85 wt. % to about 98 wt. %, or about 87.5 wt. % to about 98 wt. %, or about 90 wt. % to about 98 wt. %, or about 72.5 wt. % to about 95 wt. %, or about 75 wt. % to about 92.5 wt. %, or about 77.5 wt. % to about 90 wt. %, or about 80 wt. % to about 87.5 wt. %.

In certain embodiments of the compositions as otherwise described herein, slumgum components are present in an amount within the range of about 40 wt. % to about 60 wt. %, and beeswax is present in an amount within the range of about 35 wt. % to about 60 wt. %. For example, in certain embodiments of the compositions as otherwise described herein, slumgum components are present in an amount within the range of about 40 wt. % to about 57.5 wt. %, or about 40 wt. % to about 55 wt. %, or about 40 wt. % to about 52.5 wt. %, or about 40 wt. % to about 50 wt. %, or about 40 wt. % to about 47.5 wt. %, or about 40 wt. % to about 45 wt. %, or about 42.5 wt. % to about 60 wt. %, or about 45 wt. % to about 60 wt. %, or about 47.5 wt. % to about 50 wt. % to about 60 wt. %, or about 52.5 wt. % to about 60 wt. %, or about 55 wt. % to about 60 wt. %, or about 40 wt. % to about 57.5 wt. %, or about 40 wt. % to about 55 wt. %, or about 40 wt. % to about 52.5 wt. %, or about 40 wt. % to about 50 wt. %, or about 40 wt. % to about 47.5 wt. %, or about 40 wt. % to about 45 wt. %, or about 42.5 wt. % to about 57.5 wt. %, or about 45 wt. % to about 55 wt. %, or about 47.5 wt. % to about 52.5 wt. %, and beeswax is present in an amount within the range of about 35 wt. % to about 57.5 wt. %, or about 35 wt. % to about 55 wt. %, or about 35 wt. % to about 52.5 wt. %, or about 35 wt. % to about 50 wt. %, or about 35 wt. % to about 47.5 wt. %, or about 35 wt. % to about 45 wt. %, or about 35 wt. % to about 42.5 wt. %, or about 35 wt. % to about 40 wt. %, or about 37.5 wt. % to about 60 wt. %, or about 40 wt. % to about 60 wt. %, or about 42.5 wt. % to about 60 wt. %, or about 45 wt. % to about 60 wt. %, or about 47.5 wt. % to about 60 wt. %, or about 50 wt. % to about 60 wt. %, or about 52.5 wt. % to about 60 wt. %, or about 55 wt. % to about 60 wt. %, or about 37.5 wt. % to about 57.5 wt. %, or about 40 wt. % to about 55 wt. %, or about 42.5 wt. % to about 52.5 wt. %, or about 45 wt. % to about 50 wt. %.

In certain embodiments of the compositions as otherwise described herein, slumgum is present in an amount within the range of about 70 wt. % to about 90 wt. %, and beeswax is present in an amount within the range of about 5 wt. % to about 25 wt. %. For example, in certain embodiments of the compositions as otherwise described herein, slumgum components are present in an amount within the range of about 70 wt. % to about 87.5 wt. %, or about 70 wt. % to about 85 wt. %, or about 70 wt. % to about 82.5 wt. %, or about 70 wt. % to about 80 wt. %, or about 70 wt. % to about 77.5 wt. %, or about 70 wt. % to about 75 wt. %, or about 72.5 wt. % to about 90 wt. %, or about 75 wt. % to about 90 wt. %, or about 77.5 wt. % to about 90 wt. %, or about 80 wt. % to about 90 wt. %, or about 82.5 wt. % to about 90 wt. %, or about 85 wt. % to about 90 wt. %, or about 72.5 wt. % to about 87.5 wt. %, or about 75 wt. % to about 85 wt. %, or about 77.5 wt. % to about 82.5 wt. %, and beeswax is present in an amount within the range of about 5 wt. % to about 22.5 wt. %, or about 5 wt. % to about 20 wt. %, or about 5 wt. % to about 17.5 wt. %, or about 5 wt. % to about 15 wt. %, or about 5 wt. % to about 12.5 wt. %, or about 5 wt. % to about 10 wt. %, or about 7.5 wt. % to about 25 wt. %, or about 10 wt. % to about 25 wt. %, or about 12.5 wt. % to about 25 wt. %, or about 15 wt. % to about 25 wt. %, or about 17.5 wt. % to about 25 wt. %, or about 20 wt. % to about 25 wt. %, or about 7.5 wt. % to about 22.5 wt. %, or about 10 wt. % to about 20 wt. %, or about 12.5 wt. % to about 17.5 wt. %.

In certain embodiments of the compositions as otherwise described herein, the composition comprises at least about 80 wt. % animal-derived material. For example, in certain embodiments of the compositions as otherwise described herein, the composition comprises at least about 82.5 wt. %, or at least about 85 wt. %, or at least about 87.5 wt. %, or at least about 90 wt. %, or at least about 92.5 wt. %, or at least about 95 wt. %, or at least about 96 wt. %, or at least about 97 wt. %, or at least about 98 wt. %, or at least about 99 wt. % animal-derived material, calculated on a dried basis.

In certain embodiments of the compositions as otherwise described herein, the composition comprises less than about 20 wt. % lignocellulosic material. As used herein, the term "lignocellulosic material" describes any plant including, for example, trees, bushes, grass, and agriculture crops, and any plant-derived material, including, for example, wood. For example, in certain embodiments of the compositions as otherwise described herein, the composition comprises less than about 19 wt. %, or less then about 18 wt. %, or less than about 17 wt. %, or less than about 16 wt. %, or less than about 15 wt. %, or less than about 14 wt. %, or less than about 13 wt. %, or less than about 12 wt. %, or less than about 11 wt. %, or less than about 10 wt. %, or less than about 9 wt. %, or less than about 8 wt. %, or less than about 7 wt. %, or less than about 6 wt. %, or less than about 5 wt. %, or less than about 4.5 wt. %, or less than about 4 wt. %, or less than about 3.5 wt. %, or less than about 3 wt. %, or less than about 2.5 wt. %, or less than about 2 wt. %, or less than about 1.5 wt. %, or less than about 1 wt. % lignocellulosic material, calculated on a dried basis. In another example, in certain embodiments of the compositions as otherwise described herein, the composition is substantially free of lignocellulosic material.

In certain embodiments of the compositions as otherwise described herein, the composition comprises at least about 90 wt. % combustible material. As used herein, the term "combustible material" describes any material, including lignocellulosic and animal-derived materials, that can burn in any capacity. The person of ordinary skill in the art will appreciate that materials that burn slowly and/or without flame (i.e., smolder), and materials that burn with flame and/or burn quickly, all comprise combustible materials. For example, in certain embodiments of the compositions as otherwise described herein, the composition comprises at least about 91 wt. %, or at least about 92 wt. %, or at least about 93 wt. %, or at least about 94 wt. %, or at least about 95 wt. %, or at least about 95.5 wt. %, or at least about 96 wt. %, or at least about 96.5 wt. %, or at least about 97 wt. %, or at least about 97.5 wt. %, or at least about 98 wt. %, or at least about 98.5 wt. %, or at least about 99 wt. % combustible material, calculated on a dried basis.

In certain embodiments of the compositions as otherwise described herein, the composition further comprises one or more flavoring agents in a combined amount within the range of about 0.5 wt. % to about 20 wt. %. For example, in certain embodiments of the compositions as otherwise described herein, the composition comprises one or more flavoring agents in a combined amount within the range of about 0.5 wt. % to about 19 wt. %, or about 0.5 wt. % to about 18 wt. %, or about 0.5 wt. % to about 17 wt. %, or about 0.5 wt. % to about 16 wt. %, or about 0.5 wt. % to about 15 wt. %, or about 0.5 wt. % to about 14 wt. %, or about 0.5 wt. % to about 13 wt. %, or about 0.5 wt. % to about 12 wt. %, or about 0.5 wt. % to about 11 wt. %, or about 0.5 wt. % to about 10 wt. %, or about 1 wt. % to about 20 wt. %, or about 2 wt. % to about 20 wt. %, or about 3 wt. % to about 20 wt. %, or about 4 wt. % to about 20 wt. %, or about 5 wt. % to about 20 wt. %, or about 7.5 wt. % to about 20 wt. %, or about 10 wt. % to about 20 wt. %, calculated on a dried basis.

In certain embodiments of the compositions as otherwise described herein, the composition further comprises one flavoring agent. In other embodiments of the compositions as otherwise described herein, the composition further comprises two or more flavoring agents, such as, for example, two, three or four flavoring agents. In certain embodiments of the compositions as otherwise described herein, the composition further comprises one or more flavoring agents selected from, for example, herbs, spices, wood, and any of a number of flavoring agents familiar to the person of ordinary skill in the art. For example, in certain embodiments of the compositions as otherwise described herein, the composition further comprises one or more flavoring agents selected from herbs d' Provence, savory, marjoram, rosemary, thyme, oregano, lavender, coriander, fennel seed, peppercorn, lemon peel, and orange peel. In another example, in certain embodiments of the compositions as otherwise described herein, the composition further comprises one or more flavoring agents selected from apple wood, cherry wood, hickory wood, mesquite wood, oak wood, pecan wood, and maple wood. In some embodiments of the compositions as otherwise described herein, one or more flavoring agents may be toasted or dried, and/or ground. In yet another example, in certain embodiments of the compositions as otherwise described herein, the composition further comprises one or more flavoring agents selected from artificial smoke flavor, soy sauce flavor, and fruit flavor. The person of ordinary skill in the art will appreciate that honey may be included in the composition as a flavoring agent, provided honey is present in the composition in an amount of less than 10 wt. %.

As the person of ordinary skill in the art will appreciate, and as described in more detail below, the compositions of the present disclosure can be prepared in a variety of manners. In certain desirable embodiments, a composition as otherwise described herein is in a compressed form. For example, in certain embodiments of the compositions of the disclosure, the composition is in the compressed form of, for example, a pellet, chip, briquette, patty, puck, log, or biscuit.

Another aspect of the disclosure is a method of preparing a smoke flavoring composition. The method includes providing a formable mixture comprising beeswax, one or more slumgum components, and, optionally, honey, then forming (e.g., by compressing) the mixture. The composition comprises less than about 10 wt. % honey, at least about 2 wt. % of slumgum components, and beeswax such that the beeswax, honey, and slumgum components are present in the composition in a combined amount of at least 80 wt. %. The amounts and identities of the various components can be as otherwise described above with respect to the dried smoke flavoring compositions of the disclosure.

In certain embodiments of the methods as otherwise described herein, the formable mixture further comprises one or more flavoring agents, present in a combined amount within the range of about 0.5 wt. % to about 20 wt. %. For example, in certain embodiments of the methods as otherwise described herein, the formable mixture comprises one or more flavoring agents in a combined amount within the range of about 0.5 wt. % to about 19 wt. %, or about 0.5 wt. % to about 18 wt. %, or about 0.5 wt. % to about 17 wt. %, or about 0.5 wt. % to about 16 wt. %, or about 0.5 wt. % to about 15 wt. %, or about 0.5 wt. % to about 14 wt. %, or about 0.5 wt. % to about 13 wt. %, or about 0.5 wt. % to about 12 wt. %, or about 0.5 wt. % to about 11 wt. %, or about 0.5 wt. % to about 10 wt. %, or about 1 wt. % to about 20 wt. %, or about 2 wt. % to about 20 wt. %, or about 3 wt. % to about 20 wt. %, or about 4 wt. % to about 20 wt. %, or about 5 wt. % to about 20 wt. %, or about 7.5 wt. % to about 20 wt. %, or about 10 wt. % to about 20 wt. %, calculated on a dried basis (i.e., excluding any water not present in the smoke flavoring composition prepared according to the methods of the disclosure).

In certain embodiments of the methods as otherwise described herein, the formable mixture further comprises one flavoring agent. In other embodiments of the methods as otherwise described herein, the formable mixture further comprises two or more flavoring agents, such as, for example, two, three, or four flavoring agents. In certain embodiments of the methods as otherwise described herein, the formable mixture further comprises one or more flavoring agents selected from, for example, herbs, spices, wood, and any of a number of flavoring agents familiar to the person of ordinary skill in the art. For example, in certain embodiments of the methods as otherwise described herein, the formable mixture further comprises one or more flavoring agents selected from herbs d' Provence, savory, marjoram, rosemary, thyme, oregano, lavender, coriander, fennel seed, peppercorn, lemon peel, and orange peel. In another example, in certain embodiments of the methods as otherwise described herein, the formable mixture further comprises one or more flavoring agents selected from apple wood, cherry wood, hickory wood, mesquite wood, oak wood, pecan wood, and maple wood. In some embodiments of the compositions as otherwise described herein, one or more flavoring agents may be toasted or dried, and/or ground. In yet another example, in certain embodiments of the methods as otherwise described herein, the formable mixture further comprises one or more flavoring agents selected from artificial smoke flavor, soy sauce flavor, and fruit flavor.

As described above, the method includes forming the formable mixture. In certain embodiments of the methods as otherwise described herein, the formable mixture is formed in the presence of heat, and the method further comprises cooling the formed mixture. For example, in certain embodiments of the methods as otherwise described herein, the formable mixture is formed at a temperature within the range of about 20° C. to about 50° C., or about 20° C. to about 45° C., or about 20° C. to about 40° C., or about 20° C. to about 35° C., or about 25° C. to about 50° C., or about 30° C. to about 50° C., or about 35° C. to about 50° C., or about 40° C. to about 50° C., or about 25° C. to about 45° C., or about 30° C. to about 40° C. In another example, in certain embodiments of the methods as otherwise described herein, the formable mixture is cooled to a temperature within the range of about −20° C. to about 10° C., or about −15° C. to about 10° C., or about −10° C. to about 10° C., or about −5° C. to about 10° C., or about 0° C. to about 10° C., or about −20° C. to about 5° C., or about −20° C. to about 0° C., or about −20° C. to about −5° C., or about −20° C. to about −10° C., or about −15° C. to about 5° C., or about −10° C. to about 0° C.

As described above, the method includes forming the formable mixture. In certain embodiments of the methods as otherwise described herein, the formable mixture is formed in a press. For example, in certain embodiments of the methods as otherwise described herein, the formable mixture is formed in a press at a pressure within the range of about 1 psi to about 3000 psi, or about 10 psi to about 3000 psi, or about 20 psi to about 3000 psi, or about 30 psi to about 3000 psi, or about 40 psi to about 3000 psi, or about 50 psi to about 3000 psi, or about 75 psi to about 3000 psi, or about 100 psi to about 3000 psi, or about 150 psi to about 3000 psi, or about 200 psi to about 3000 psi, or about 250 psi to about 3000 psi, or about 500 psi to about 3000 psi, or about 1000 psi to about 3000 psi, or about 1500 psi to about 3000 psi, or about 2000 psi to about 3000 psi, or about 1 psi to about 2500 psi, or about 1 psi to about 2000, or about 1 psi to about 1500 psi, or about 1 psi to about 1000 psi, or about 1 psi to about 750 psi, or about 1 psi to about 500 psi, or about 1 psi to about 250 psi, or about 1 psi to about 200 psi, or about 1 psi to about 150 psi, or about 1 psi to about 100 psi, or about 1 psi to about 75 psi, or about 1 psi to about 50 psi, or about 10 psi to about 2500 psi, or about 25 psi to about 2000 psi, or about 50 psi to about 1500 psi, or about 75 psi to about 1000 psi, or about 100 psi to about 750 psi, or about 150 psi to about 500 psi. In another example, in certain embodiments of the methods as otherwise described herein, the formable mixture is formed in a press for a period of time within the range of about 30 minutes to about 24 hours, or about 1 hours to about 24 hours, or about 2 hours to about 24 hours, or about 3 hours to about 24 hours, or about 4 hours to about 24 hours, or about 6 hours to about 24 hours, or about 8 hours to about 24 hours, or about 10 hours to about 24 hours, or about 12 hours to about 24 hours, or about 30 minutes to about 20 hours, or about 30 minutes to about 16 hours, or about 30 minutes to about 14 hours, or about 30 minutes to about 12 hours, or about 30 minutes to about 10 hours, or about 30 minutes to about 8 hours, or about 30 minutes to about 6 hours. Advantageously, the pressure and/or length of the time of formation of the formable mixture can be selected to provide a smoke flavoring composition that, when burned, provides a desired amount of smoke, and/or burns for a desired period of time.

In one aspect of the methods of the disclosure, the composition comprises less than about 10 wt. % water. In certain embodiments of the methods as otherwise described herein, the formable mixture comprises less than about 10 wt. % water. In other embodiments of the methods as otherwise described herein, the formable mixture comprises more than about 10 wt. % water, and the method further comprises drying the formable mixture to provide a formable mixture comprising less than about 10 wt. % water, which mixture is then formed. In other embodiments of the methods as otherwise described herein, the formable mixture comprises more than about 10 wt. % water, and the method further comprises drying the formed mixture to provide a formed mixture comprising less than about 10 wt. % water. In other embodiments of the methods as otherwise described herein, the cooled, formed mixture comprises more than about 10 wt. % water, and the method further comprises drying the cooled, formed mixture to provide a formed mixture comprising less than about 10 wt. % water. For example, in certain embodiments of the methods as otherwise described herein, the composition comprises less than about 9 wt. %, or less than about 8 wt. %, or less than about 7 wt. %, or less than about 6 wt. %, or less than about 5 wt. %, or less than about 4 wt. %, or less than about 3 wt. %, or less than about 2.5 wt. %, or less than about 2 wt. %, or less than about 1.5 wt. %, or less than about 1 wt. % water.

In one aspect of the methods of the disclosure, the compositions comprises less than about 10 wt. % honey. In certain embodiments of the methods as otherwise described herein, the formable mixture comprises less than about 10 wt. % honey. In other embodiments of the methods as otherwise described herein, the formable mixture comprises more than about 10 wt. % honey, and the method further comprises removing honey from the formable mixture as the formable mixture is dried, to provide a formable mixture comprising less than about 10 wt. % honey, which mixture is then formed. In other embodiments of the methods as otherwise described herein, the formable mixture comprises more than about 10 wt. % honey, and the method further comprises removing honey from the formable mixture as the formable mixture is formed, to provide a formed mixture comprising less than about 10 wt. % honey.

The formable mixture or formed mixture of the methods of the disclosure may be dried (e.g., to remove honey and/or to remove water) using a variety of means. For example, in certain embodiments of the methods as otherwise described herein, the formable mixture or formed mixture is dried in a solar wax melter, a dehydrator, or a freeze dryer.

In certain embodiments of the methods as otherwise described herein, the method further comprises coating the formed mixture with a combustible material. For example, in certain embodiments of the methods as otherwise described herein, the method further comprises coating the formed mixture with a combustible material selected from animal-derived materials, such as beeswax, and lignocellulosic materials, such as particulate wood.

Another aspect of the disclosure is a smoke flavoring composition prepared by a method as described herein. The present inventors have determined that such smoke flavoring compositions, advantageously, are natural and resistant to flaming and dripping, and burn consistently while providing a desirable smoke flavor.

Accordingly, another aspect of the disclosure is a method for providing smoke flavor that includes burning a smoke flavor composition as described herein to provide smoke, and contacting food with the smoke (i.e., a smoking method). In certain embodiments of the smoking methods as otherwise described herein, the smoking method further comprises burning additional smoking material to provide additional smoke. For example, in certain embodiments of such smoking methods, the method further comprises burning charcoal or hardwoods.

In certain embodiments of the smoking methods as otherwise described herein, the smoke is contacted with food in a food preparation apparatus. As used herein, the term "food preparation apparatus" describes any equipment in which smoke may be contacted with food. In certain embodiments of the smoking methods as otherwise described herein, the smoke flavor composition is burned in the food preparation apparatus. A food preparation apparatus may be any equipment in which a cold smoking process, a hot smoking process, or a smoke roasting process is performed. In some embodiments of the methods as otherwise described herein, the food preparation apparatus may comprise a hot smoker, such as, for example, an offset smoker, vertical smoker, smoke box, vertical water smoker, or propane smoker. In some embodiments of the methods as otherwise described herein, the food preparation apparatus may comprise a smoke roaster such as, for example, an oven, grill, barbecue, or barbecue pit.

In certain embodiments of the smoking methods as otherwise described herein, the smoke is contacted with food in a hot smoker. In certain embodiments of such smoking methods, a smoke flavoring composition as described herein may serve as the only smoking material in a hot smoker, or may be used in combination with any number of other smoking materials suitable for a hot smoker, such as, for example, wood pellets. Advantageously, the means for controlling temperature and airflow in a conventional hot smoker may be used similarly when a smoke flavoring composition as described herein is utilized as a smoking material instead of, or in addition to, conventional smoking materials. In certain other embodiments of the smoking methods as otherwise described herein, the smoke is contacted with food in a smoke roaster. For example, in certain embodiments of such smoking methods, a smoke flavoring composition as described herein may provide smoke flavor in a smoke roaster also containing any of a number of other smoking materials suitable for a smoke roaster, such as, for example, charcoal or wood pellets.

EXAMPLES

The Examples that follow are illustrative of specific embodiments of the invention, and various uses thereof. They are set forth for explanatory purposes only, and are not to be taken as limiting the invention.

Example 1 Preparation Procedure 1

01—Dry the material containing slumgum components to remove any excess water or moisture. Drying can be done in a commercial dehydrator to eliminate any excess moisture content in a temperature-safe environment to prevent bacteria/mold growth.
02—Inspect the material and remove any undesirable components.
03—Pulverize the dried material into small chunks.
04—Optionally, toast and grind dried spices such as toasted coriander, fennel seed, toasted peppercorn, dried lavender, dried thyme, dried oregano, herbs d' Provence, dried orange peel, dried lemon peel.
05—Weigh 28 gram portions of pulverized material and transfer to die for pressing.
*optionally, mix with 2 grams of toasted, ground, dried spice(s).
06—Press to form into shape. Press with maximum amount of pressure in a warm environment for a time within the range of 4-6 hours in order for the wax in the composition to temper and distribute evenly.
07—Once pressed, cool to below 40° F. to let the composition set up.
08—Moisture content should be checked and monitored before packaging to eliminate any chance of mold or bacteria growth. If moisture content is existent, dehydrate the composition at 100° F., until the moisture content is at an appropriate level.
09—Store in breathable containers in a cool, dry space until use.

These smoke flavor compositions can be used in commercial or personal food smokers, or can be added to charcoal grills to provide smoke flavor. These compositions may be used in place of conventional smoking materials such as hardwood in most applications. Advantageously, the present inventors have determined that the use of conventionally discarded, natural slumgum materials produces a smoking material that burns consistently and evenly, and provides a desirable smoke flavor.

Example 2 Preparation Procedure 2

01—Dry the material containing slumgum components to remove any excess water or moisture. Drying can be done in a commercial dehydrator to eliminate any excess moisture content in a temperature-safe environment to prevent bacteria/mold growth.
02—Inspect the material and remove any undesirable components.
03—Grind the dried material into coarsely ground crumb/powder.
04—Optionally, toast and grind dried spices such as toasted coriander, fennel seed, toasted peppercorn, dried lavender, dried thyme, dried oregano, herbs d' Provence, dried orange peel, dried lemon peel.
05—Weigh 28 gram portions of ground material and transfer to die for pressing.
*optionally, mix with 2 grams of toasted, ground, dried spice(s).
06—Press to form into shape. Press with maximum amount of pressure in a warm environment for a time within the range of 4-6 hours in order for the wax in the composition to temper and distribute evenly.
07—Once pressed, cool to below 40° F. to let the composition set up.
08—Moisture content should be checked and monitored before packaging to eliminate any chance of mold or bacteria growth. If moisture content is existent, dehydrate the composition at 100° F., until the moisture content is at an appropriate level.
09—Store in breathable containers in a cool, dry space until ready to use.

These pucks can be used in commercial or personal food smokers, or added to charcoal grills to provide smoke flavor. These compositions may be used in place of conventional smoking materials such as hardwood in most applications. Advantageously, the present inventors have determined that the use of conventionally discarded, natural slumgum materials produces a smoking material that burns consistently and evenly, and provides a desirable smoke flavor.

Example 3 Preparation Procedure 3

01—Dry the material containing slumgum components to remove any excess water or moisture. Drying can be done in a commercial dehydrator to eliminate any excess moisture content in a temperature-safe environment to prevent bacteria/mold growth.
02—Inspect the material and remove any undesirable components.
03—Grind the dried material into coarsely ground crumb/powder.
04—Optionally, toast and grind dried spices such as toasted coriander, fennel seed, toasted peppercorn, dried lavender, dried thyme, dried oregano, herbs d' Provence, dried orange peel, dried lemon peel.
05—Weigh 28 gram portions of ground material and transfer to die for pressing.
*optionally, mix with 2 grams of toasted, ground, dried spice(s).
06—Press to form into shape. Press with maximum amount of pressure in a warm environment for a time within the range of 4-6 hours in order for the wax in the composition to temper and distribute evenly.
07—Once pressed, cool to below 40° F. to let the composition set up.
08—Moisture content should be checked and monitored before packaging to eliminate any chance of mold or bacteria growth. If moisture content is existent, dehydrate the composition at 100° F., until the moisture content is at an appropriate level.
09—Dip the dried compositions in beeswax to create a combustible coating that also inhibits bacteria or mold growth.
10—Store in breathable containers in a cool, dry space until ready to use.

These pucks can be added to charcoal grills to provide smoke flavor. Advantageously, the present inventors have determined that the use of conventionally discarded, natural slumgum materials provides a desirable smoke flavor when used in combination with charcoal.

Example 4 Preparation Procedure 4

01—Dry the material containing slumgum components to remove any excess water or moisture. Drying can be done in a commercial dehydrator to eliminate any excess moisture content in a temperature-safe environment to prevent bacteria/mold growth.

02—Inspect the material and remove any undesirable components.

03—Grind the dried material into coarsely ground crumb/powder.

04—Optionally, toast and grind dried spices such as toasted coriander, fennel seed, toasted peppercorn, dried lavender, dried thyme, dried oregano, herbs d' Provence, dried orange peel, dried lemon peel.

05—Mix the pulverized material with beeswax and blend well to incorporate uniformly. Weigh 28 gram portions of mixed material and transfer to die for pressing.

*optionally, mix with 2 grams of toasted, ground, dried spice(s).

06—Press to form into shape. Press with maximum amount of pressure in a warm environment for a time within the range of 4-6 hours in order for the wax in the composition to temper and distribute evenly.

07—Once pressed, cool to below 40° F. to let the composition set up.

08—Moisture content should be checked and monitored before packaging to eliminate any chance of mold or bacteria growth. If moisture content is existent, dehydrate the composition at 100° F., until the moisture content is at an appropriate level.

09—Store in breathable containers in a cool, dry space until use.

These smoke flavor compositions can be used in commercial or personal food smokers, or can be added to charcoal grills to provide smoke flavor. These compositions may be used in place of conventional smoking materials such as hardwood in most applications. Advantageously, the present inventors have determined that the use of conventionally discarded, natural slumgum materials produces a smoking material that burns consistently and evenly, and provides a desirable smoke flavor.

Example 5 Drying Procedure 266 oz. of material containing slumgum components was dried in a solar wax melter to provide 198 oz. of a formable mixture containing slumgum components. The 68 oz. of material lost (26% of the original mass) comprised water and honey.

We claim:

1. A dried smoke flavoring composition comprising
one or more slumgum components;
beeswax, present in an amount of about 20-90 wt. %; and
optionally, honey;
wherein the composition comprises less than about 10 wt. % honey, calculated on a dried basis;
wherein the slumgum components are present in the composition in an amount of at least about 2 wt. %, calculated on a dried basis; and
wherein the beeswax, honey, and slumgum components are present in the composition in a combined amount of at least about 80 wt. %, calculated on a dried basis.

2. The dried composition of claim 1, wherein one or more slumgum components are selected from carcasses, brood cocoons, larvae, pollen, propolis, and excrement.

3. The dried composition of claim 1, wherein the beeswax, honey, and slumgum components are present in the composition in a combined amount of at least about 90 wt. %.

4. The dried composition of claim 1, wherein the composition comprises at least about 80 wt. % animal-derived material.

5. The dried composition of claim 1, wherein the composition comprises less than about 20 wt. % lignocellulosic material.

6. The dried composition of claim 1, wherein the composition comprises at least about 90 wt. % combustible material.

7. The dried composition of claim 1, further comprising one or more flavoring agents, present in a combined amount within the range of about 0.5 wt. % to about 20 wt. %.

8. A dried smoke flavoring composition comprising
one or more slumgum components;
beeswax;
one or more flavoring agents selected from herbs d' Provence, savory, marjoram, rosemary, thyme, oregano, lavender, coriander, fennel seed, peppercorn, apple wood, cherry wood, hickory wood, mesquite wood, oak wood, pecan wood, maple wood, artificial smoke flavor, and soy sauce flavor, present in a combined amount within the range of about 0.5 wt. % to about 20 wt. %; and optionally, honey;
wherein the composition comprises less than about 10 wt. % honey, calculated on a dried basis;
wherein the slumgum components are present in the composition in an amount of at least about 2 wt. %, calculated on a dried basis; and
wherein the beeswax, honey, and slumgum components are present in the composition in a combined amount of at least about 80 wt. %, calculated on a dried basis.

9. The dried composition of claim 1, wherein the composition comprises less than about 10 wt. % water.

10. The dried composition of claim 1, in the form of a pellet, chip, briquette, patty, puck, log, or biscuit.

11. A method for preparing a smoke flavoring composition according to claim 1, the method comprising
providing a formable mixture comprising
one or more slumgum components;
beeswax; and
optionally, honey; and
forming the mixture;
wherein the composition comprises less than about 10 wt. % honey;
wherein the slumgum components are present in the composition in an amount of at least about 2 wt. %;
wherein the beeswax, honey, and slumgum components are present in the composition in a combined amount of at least about 80 wt. %; and
wherein the composition comprises less than about 10 wt. % water.

12. A method according to claim 11, wherein one or more slumgum components are selected from carcasses, brood cocoons, larvae, pollen, propolis, and excrement.

13. A method according to claim 11, wherein the formable mixture further comprises one or more flavoring agents selected from herbs d' Provence, savory, marjoram, rosemary, thyme, oregano, lavender, coriander, fennel seed, peppercorn, apple wood, cherry wood, hickory wood, mesquite wood, oak wood, pecan wood, maple wood, artificial smoke flavor, and soy sauce flavor, present in a combined amount within the range of about 0.5 wt. % to about 20 wt. %.

14. A method according to claim 11, further comprising coating the formed mixture with a combustible material, e.g., beeswax.

15. A method of providing smoke flavor comprising burning the smoke flavoring composition of claim 1 to provide smoke, and contacting the smoke with food, e.g., in a hot smoker or a smoke roaster.

16. A method according to claim 15, further comprising burning an additional smoking material to provide additional smoke, and contacting the additional smoke with the food;
wherein the additional smoking material is selected from charcoal and hardwoods.

17. The dried smoke flavoring composition of claim 1, wherein
the beeswax is present in an amount of about 20-70 wt. %, calculated on a dried basis; and
the slumgum components are present in the composition in an amount of at least about 10 wt. %, calculated on a dried basis.

18. The dried smoke flavoring composition of claim 1, wherein
the beeswax is present in an amount of about 40-90 wt. %, calculated on a dried basis; and
the slumgum components are present in the composition in an amount of at least about 5 wt. %, calculated on a dried basis.

19. The dried smoke flavoring composition of claim 8, wherein the beeswax is present in an amount of about 20-90 wt. %, calculated on a dried basis.

20. The dried smoke flavoring composition of claim 8, wherein
the beeswax is present in an amount of about 20-70 wt. %, calculated on a dried basis; and
the slumgum components are present in the composition in an amount of at least about 10 wt. %, calculated on a dried basis.

* * * * *